United States Patent [19]

Hamaue

[11] Patent Number: 5,190,240
[45] Date of Patent: Mar. 2, 1993

[54] BELT RETRACTOR SHAFT-ROTATING PRETENSIONER

[75] Inventor: Tetsuya Hamaue, Shiga, Japan

[73] Assignee: Takata Corporation, Tokyo, Japan

[21] Appl. No.: 849,516

[22] Filed: Mar. 11, 1992

[30] Foreign Application Priority Data

Mar. 12, 1991 [JP] Japan .................................. 3-70297

[51] Int. Cl.⁵ .......................................... B60R 22/46
[52] U.S. Cl. ..................................... 242/107; 280/806
[58] Field of Search ........... 242/107, 107.4 A, 107.4 B, 242/107.4 R; 280/806, 807; 297/478, 480

[56] References Cited

U.S. PATENT DOCUMENTS

| | | | |
|---|---|---|---|
| 4,750,686 | 6/1988 | Fohl | 242/107 |
| 4,932,603 | 6/1990 | Yamanoi et al. | 242/107 |
| 5,098,030 | 3/1992 | Kosugi | 242/107 |
| 5,114,090 | 5/1992 | Lindblad | 242/107 |

FOREIGN PATENT DOCUMENTS 1-168547 4/1989 Japan .

Primary Examiner—John M. Jillions
Attorney, Agent, or Firm—Brumbaugh, Graves, Donohue & Raymond

[57] ABSTRACT

A belt retractor shaft-rotating pretensioner for a vehicle seat belt comprises a cable, a power source coupled to a pulling portion of the cable for pulling the cable, and a mechanism for coupling a pulled portion of the cable to a reel shaft of the belt retractor when the cable is pulled to transmit rotation to the reel shaft. A brake unit ensures that the coupling mechanism remains engaged with the reel shaft when the cable is pulled. The brake unit includes a friction device on one end of a lever that frictionally engages the pulling portion of the cable and generates a braking input force when the cable is pulled and a brake shoe on the other end of the lever for transmitting the braking input force to the pulled portion of the cable.

1 Claim, 5 Drawing Sheets

BELT RETRACTOR SHAFT-ROTATING PRETENSIONER

BACKGROUND OF THE INVENTION

The present invention relates to a belt pretensioner for a vehicle seat belt system and, in particular, to a pretensioner for tightening the belt by rotating the belt reel shaft of a belt retractor in the belt-winding direction.

Some vehicle seat belt systems have a pretensioner for tightening a belt worn by an occupant of the vehicle in order to tightly restrain the body of the occupant in an emergency and to prevent the occupant from undergoing secondary collision within the vehicle. Such a pretensioner is disclosed in Japanese Provisional Patent Publication No. 1-168547.

In the pretensioner of Japanese Publication No. 1-168547, a plurality of segmental arcuate pieces arranged in a circle around a belt reel shaft of a retractor are normally held in clearance from the shaft so that the retractor can function normally. When a cable wound around the pieces is pulled by a power source, the pieces are forced into engagement with the reel shaft and transmit displacement of the cable to the reel shaft such as to wind a portion of the belt onto the belt reel of the retractor. In this unit, an end portion of the cable is received in a groove in the casing that receives the pieces, and a braking load is applied to the end portion by a spring at a turn in the groove in order to maintain engagement between the pieces and the reel shaft and to transmit displacement of the cable to the reel shaft through the pieces.

In the above-described previously known pretensioner, the end portion of the cable to which the braking load is applied must be of a length at least equal to that of the stroke of the power source. Thus, space for accommodating this portion must be provided in the casing, and the requirement for such space prevents reducing the size and weight of the unit. To avoid this problem, it has been proposed, alternatively, to eliminate the end portion and, instead, attach the end of the cable directly to the pieces, but this makes the device less reliable in operation because the engagement is more unstable than in the case when the braking load is applied as described above.

SUMMARY OF THE INVENTION

An object of the present invention is to provide a belt retractor shaft-rotating pretensioner that is more reliable in operation and smaller in size and weight than the previously known device referred to above.

The foregoing object is attained, in accordance with the present invention, by a belt retractor shaft-rotating pretensioner for a vehicle seat belt comprising a cable, a power source coupled to a pulling portion of the cable for pulling the cable, and a mechanism for coupling a pulled portion of the cable to the reel shaft of the belt retractor when the cable is pulled to transmit rotation to the reel shaft. A braking mechanism is provided to ensure that the coupling mechanism remains engaged with the reel shaft when the cable is pulled by maintaining a constant tension in the pulled portion of the cable. The braking mechanism includes a mechanism in frictional engagement with the pulling portion of the cable such as to generate a braking input force when the cable is pulled and a mechanism for transmitting the braking input force to the pulled portion of the cable For a better understanding of the invention, reference may be made to the following description of an exemplary embodiment, taken in conjunction with the accompanying drawings.

DESCRIPTION OF THE EMBODIMENT

Figure 1:
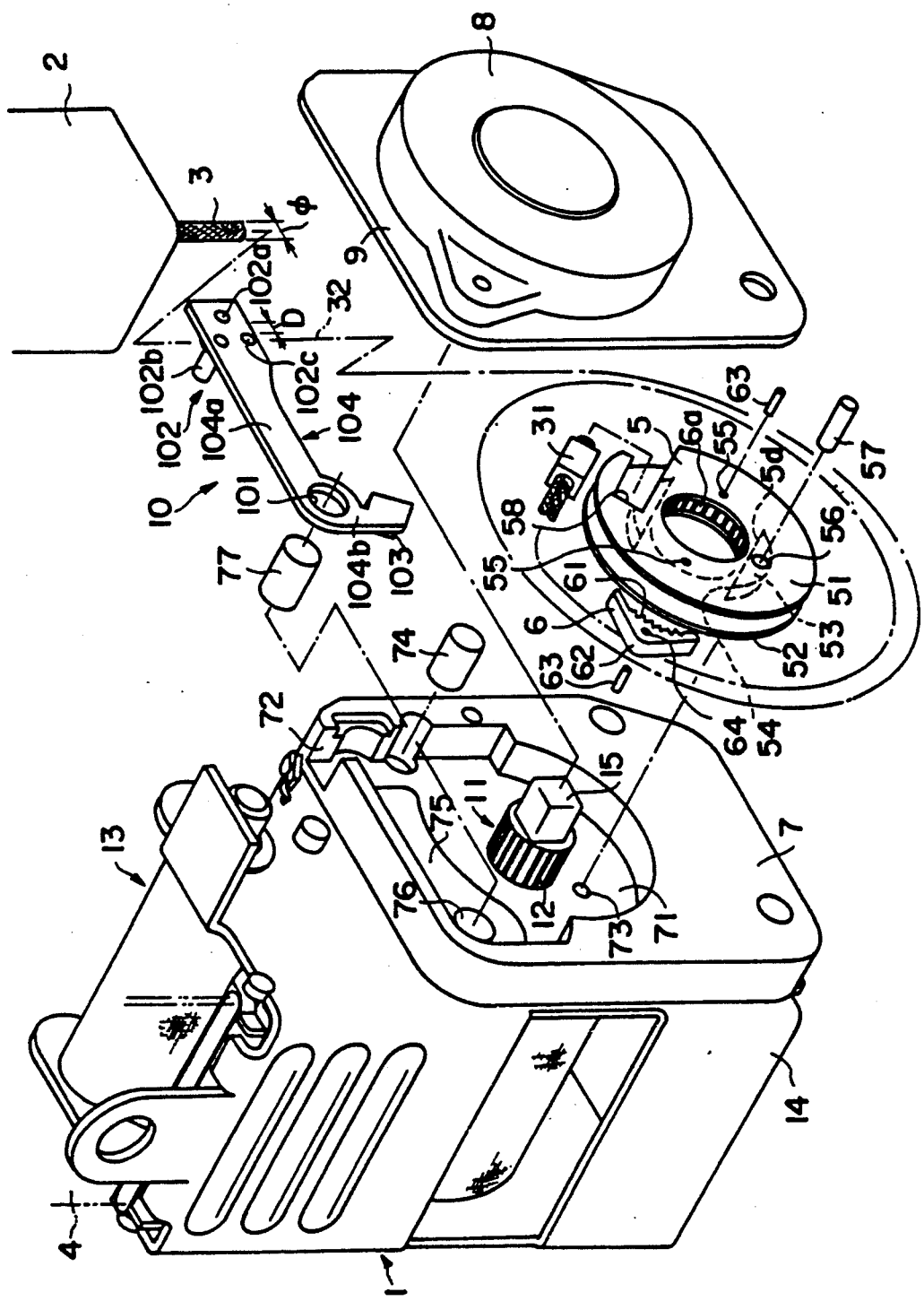
FIG. 1 is an exploded pictorial view of an embodiment of a pretensioner according to the present invention.

In the embodiment, referring to FIG. 1, a stranded wire cable 3 is connected between a power source 2 and a pulley 5 that is arranged to be coupled to a belt reel shaft 11 of a seat belt retractor 1 by latches 6 when the cable 3 is pulled by the power source. Pretension is imparted to a belt 4 of a seat belt system upon rotation of the reel shaft 11 in the belt-winding direction. Thus, a belt retractor shaft-rotating type pretensioner is provided.

A brake unit 10 ensures that the latches 6 stay engaged with the belt reel shaft when the cable is pulled by the power source by maintaining a substantially constant tension in the pulled portion of the cable 3. The brake unit has a device 102 for the generation of a brake input force, namely three contact pins 102a, 102b, and 103c that frictionally engages the pulling portion of the cable. The brake input force is transmitted by a friction plate 104 to a brake shoe 103 that frictionally engages the pulley 5, and since the pulled portion of the cable is attached by an end block 31 to the pulley 5, the pulled portion of the cable is thereby subjected to a braking force.

In particular, the seat belt retractor 1 is of a previously known design that includes a belt-clamping mechanism 13. A fixed member in the form of a block 7 is mounted on one side wall of the retractor frame 14 by suitable means (not shown). The block 7 has a generally circular pulley-receiving recess 71 that receives the pulley 5 and a channel 72 leading generally tangentially from the recess in the direction of the power source 2 through which the pulling portion 32 of the cable 3 passes from the pulley to the power source 7.

A pinion gear 12 having a square (or otherwise non-circular) hole is affixed on a portion of a matching shape of the retractor reel shaft 11, whereby the gear rotates with the reel shaft. A portion 15 of the reel shaft projects outwardly with respect to the gear 12 and is connected to one end of a spiral winding spring 8 of the retractor.

The pulley 5 has relatively large flanges 51 and 52, and the cable 3 is wound in a spiral on the pulley in the radial direction by lap winding. On a hollow hub portion 53 of the pulley 5, which connects the flanges 51 and 52 of the pulley 5, there is provided a rectangular hole or guideway 54 passing through the center of the hub and extending in a direction transverse to the axis of the hub. The guideway 54 receives a pair of latches 6, which are slidably engaged with both edges and their inner and outer surfaces guided in the radial direction. (Only one of the latches is shown in FIG. 1, but both are shown in other figures). The latches 6 have internal teeth 61 formed on their inner edge, while the outer periphery 62 is V-shaped and serves as an operational connector with the cable 3. Near the center of each latch is a small hole 64 that extends in the lateral direction and receives a latch-holding pin 63 that serves as a shear pin and is received in a pair of small holes 55 on each of the inner and outer flanges 51 and 52 of the pulley 5. The pulley 5 has a hole 56, which completely passes through it in the axial direction and receives a pulley-holding pin 57. The pin 57 functions as a shear pin, one end being received in a hole 73 in the block 7.

The above latch-holding pins 63 and the pulley-holding pin 57 comprise shear pins with different shear strengths, the latch-holding pins 63 being designed to break at a lower shear load than that of the pulley-holding pin 57.

A part of the outer flange 51 of the pulley 5 is cut out in a generally tangential direction to form a notch 58. The pulled end of the cable 3 is attached to the pulley 5 by hooking into the notch 58 a stop block 31 that is crimped on the end of the cable 3. The cable 3 makes almost a full turn around the inner periphery of the pulley 5 from the starting end (the block), passes over the block 31, and then makes one more turn around the pulley. The pulling portion 32 of the cable passes through the channel 72 in the block 7 and is connected to a piston (not shown) of the power source 2.

The friction plate 104, which is in the form of a lever, of the brake unit 10 is received in a recess 75 located in the upper portion of the block 7 and has a hole 101 by which it is pivotally mounted on a pivot shaft 77 installed in a hole 76 in the block. The friction plate 104 is L-shaped and has adjacent the end of one arm 104a means 102 for frictionally engaging the cable, whereby a brake input force is generated when the pulling portion 32 of the cable 3 is pulled. In the embodiment, the means 102 comprises the three contact pins 102a, 102b and 102c, which project laterally from the surface of the friction plate 10. Of these contact pins, the contact pin 102a at the outermost position relative to the pivot shaft 77 and the contact pins 102b and 102c located at inner positions are arranged to form a triangle. The width of the gap D between a line tangent to the sides of the pins 102b and 102c nearer the pin 102a and the side of the pin 102a nearest that line is slightly narrower than the diameter of the cable 3. As the result, a slight bending of the cable occurs as the cable 3 passes through the gap D, and the pulling portion 32 of the cable 3 is squeezed by a predetermined force. Upon movement of the cable through the gap, the squeezing force on the cable generates a frictional force on the friction plate 104. This frictional force is the brake input force of the brake unit 10.

Figure 3:
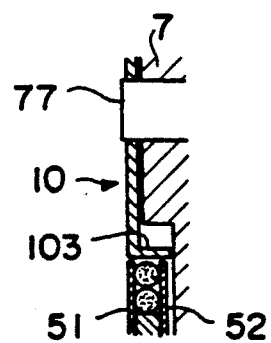
FIG. 3 is a fragmentary cross-sectional view of the embodiment, taken along a broken plane indicated by the lines 3—3 of FIG. 2.

The arm 104b of the friction plate 104 extends in a direction generally tangential to the pulley 5 and is shorter than the arm 104a. The end of the arm 104b is bent laterally to provide a brake shoe 103. As shown in FIG. 3, the brake shoe 103 has a braking surface that matches the width of the pulley 5. When the friction plate 104 is rotated around the pivot shaft 77, the brake shoe is pressed against the outer periphery of the outer and inner flanges 51 and 52 of the pulley 5, and a predetermined braking force is applied on the pulley 5. Thus, a brake unit 10 is provided for the pretensioner for ensuring that the coupling means remains engaged with the reel shaft when the cable is pulled, including means 102 frictionally engaging the pulling portion 32 of the cable 3 for generating a brake input force when the cable is pulled and means 104 and 103 for transmitting the breaking input force to the pulled portion of the cable.

The outward face of the block 7 is covered with a cover 9, and the winding spring 8 of the retractor 1 is mounted under the cover 9. Reference numeral 74 designates a cable guide pin, which is located on one side of the cable-pulling channel 72.

Figure 2:
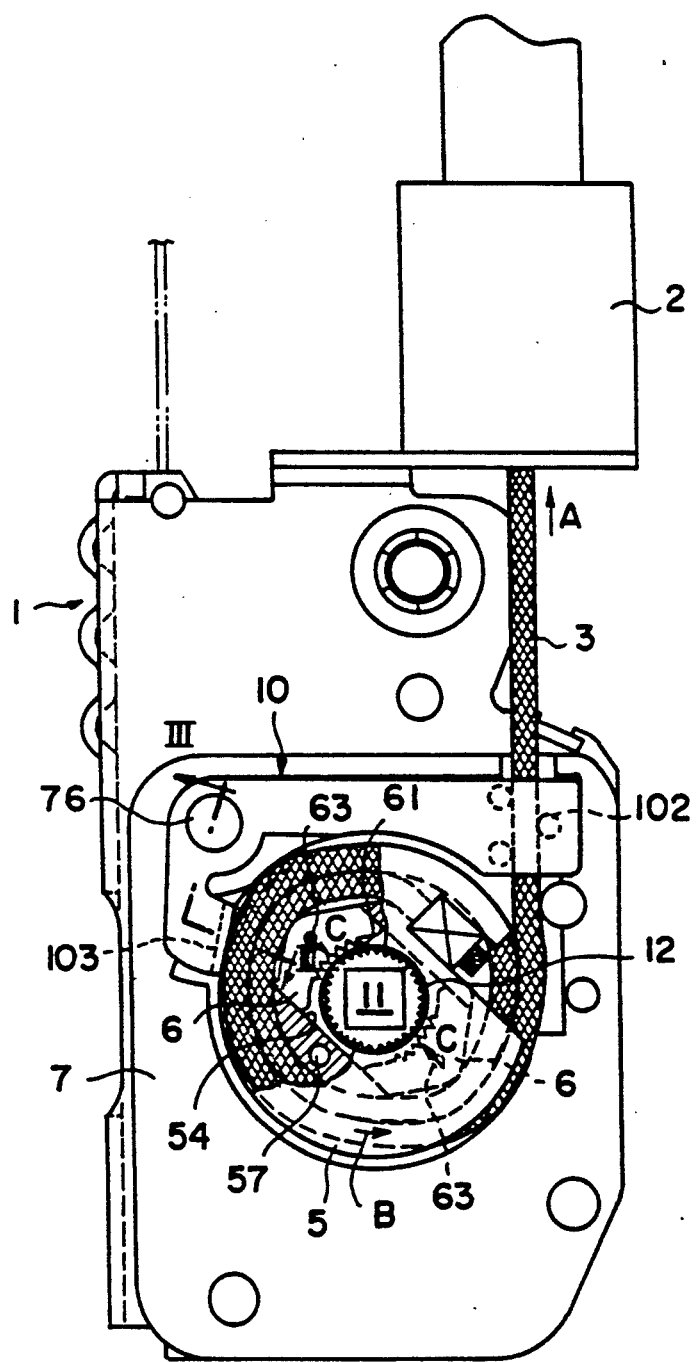
FIG. 2 is an end elevational view, portions of which are broken away in cross section, showing the configuration of the pretensioner in the "set" position.

FIG. 2 shows the pretensioner of FIG. 1 in the "set" condition. The latches 6 are positioned and fixed at the predetermined positions in the guideway 54 of the pulley 5 by means of the respective latch-holding pins 63, which are received through the small hole 55 of the pulley flange and the hole 64 (FIG. 1). The pulley-holding pin 57, which passes through the hole 56 in the pulley 5 and is received in the hole 73 (FIG. 1) in the block 7, prevents the pulley 5 from rotating. In the present embodiment, the centering and the positioning of the pulley 5 in the set position are maintained by the shear pin 57 and the cable 3, which is sufficiently stiff to keep the pulley from pivoting about the shear pin 57. Therefore, the external teeth of the gear 12 and the internal teeth 61 of the latches 6 are not engaged and are at a certain clearance. In this "set" state, the retractor 1 can function normally to wind the belt onto the reel shaft and permit the belt to be unwound from the reel shaft.

When a large acceleration G is applied in a vehicle collision under this set condition and the power source 2 is triggered in response to an acceleration sensor (not shown), the cable 3 is pulled by the power source 2 in the direction A, and a rotating force is applied counterclockwise in the direction B on the pulley 5 with the cable 3 wound on it. At the same time, the pulling portion of the cable generates a frictional force on the brake force input unit 102, which rotates the friction plate 104 counterclockwise about the pivot pin 76. The brake input force is transmitted by the friction plate to the brake shoe 103, thereby applying a braking force to the pulley 5. Inasmuch as the end of the pulled portion of the cable is connected to the pulley, the braking force impedes rotation of the cable end.

The pulley-holding pin 57 for positioning and holding the pulley 5 initially prevents the rotation o the pulley 5 by the pulling force applied to it by the cable 3, and the latches 6 of the pulley 5 receive a force generally radially toward the reel shaft 11 of the retractor in the direction C by the tightening of the cable 3. The latch-holding pins 63 holding the latches 6 on the pulley are sheared by these forces, and the latches 6 are displaced inwardly such as to engage the internal teeth 61 of the latches with the external teeth of the gear 12.

Figure 4:
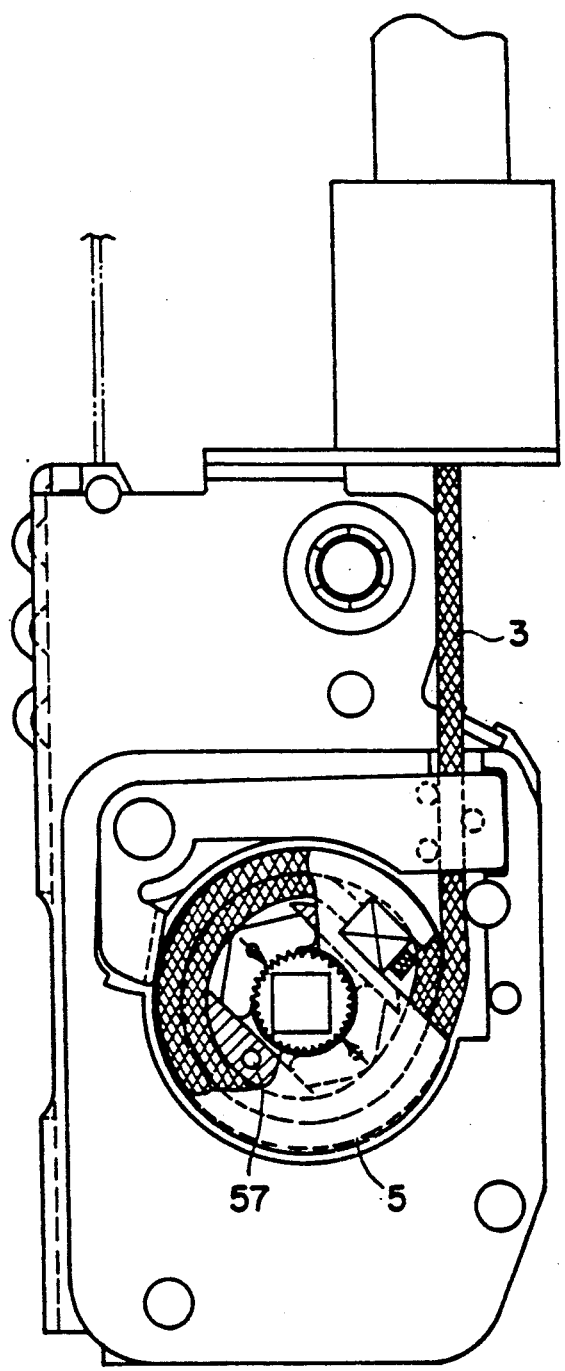
FIG. 4 is a side view similar to FIG. 2, but showing the configuration of the pretensioner after the power source has been triggered.

FIG. 4 shows the condition of the embodiment after shearing of the latch holding-pins. After the internal teeth of the latches are engaged with the external teeth of the gear, as described above, the pulling force exerted by the pulling portion of the cable 3 works as a force to rotate the pulley 5, and the pulley-holding pin 57 is sheared.

Figure 5:
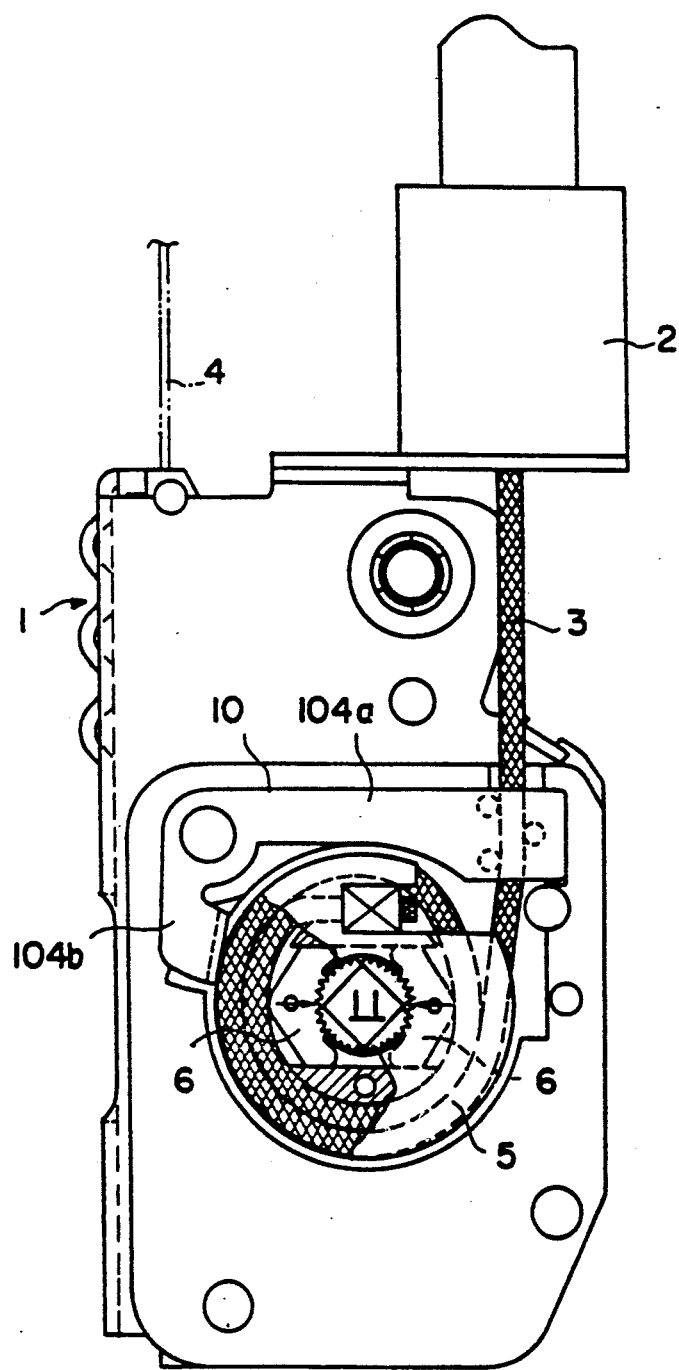
FIG. 5 is a side view similar to FIG. 4, showing its configuration at a later stage of its operation.

As shown in FIG. 5, the pulling force of the power source 2 is used to maintain the engagement of internal and external teeth of the latches and the gear and for the rotation of the pulley 5. During this phase of the operation of the pretensioner, the friction plate applies a braking load on the pulley 5, and thus the pulled portion of the cable 3 is subject to a force that maintains a constant tension in the pulled portion that keeps the latches engaged firmly with the reel shaft 11 of the retractor 1. As the pulley is rotated, it rotates the shaft, and a portion of the belt 4 is wound onto the retractor 1 within a short time, thereby pretensioning the belt firmly against the body of the occupant before the occupant is thrown forward by an inertia force.

In the pretensioner of the above embodiment, the end of the cable 3 is attached to the pulley 5. Accordingly, the braking load is applied to the pulled end of the cable 3 when it is applied on outer periphery of the pulley 5. Therefore, compared with the prior art device described above, the cable length can be shortened by the length of the piston stroke of the power source 2, and this enables the block 7 to be reduced in size. Also, because the arm 104a of the friction plate 10 is elongated and the arm 104b is shortened to increase the rotation torque on the arm portion, it is possible to exert a large braking force with a small resistance to the belt-pulling force. Further, because the cable 3 is wound on the pulley 5 in the radial direction by lap winding, the axial dimension of the pretensioner mechanism can be kept small.

Having now fully described the embodiment, it will be apparent to those skilled in the art that many changes and modifications can be made according to the actual operating conditions and the selection of component materials without departing from the spirit or scope of the invention as set forth in the claims.

For example, whereas the embodiment has movable latches on the pulley 5 that move radially into engagement with the take-up shaft 11, it is also possible to form internal teeth directly on the inner periphery of the pulley to engage the external teeth of the gear and to transmit the rotation of the pulley directly to the gear drum. The friction unit holds the pulley in engagement with the gear in a manner similar to the embodiment.

Also, it is possible to provide a cylindrical bearing on the outermost portion of the gear on the reel shaft to ensure centering of the pulley by supporting the inner periphery of the outer flange of the pulley on the bearing.

As described above, there is provided according to the present invention a mechanism for applying a braking load on the pulled cable end and to continuously apply a constant tension on the cable of a belt retractor shaft-rotating pretensioner. Because the engagement force is stably applied to the cable to engage the coupling device with the take-up shaft of the seat belt retractor, the pretensioner can be of smaller size and has increased reliability of operation.

I claim:

1. A belt retractor shaft-rotating pretensioner for a vehicle seat belt comprising a cable, power source means coupled to a pulling portion of the cable for pulling the cable, means for coupling a pulled portion of the cable to a reel shaft of the belt retractor when the cable is pulled to transmit rotation to the reel shaft, and braking means for ensuring that the coupling means remains engaged with the reel shaft when the cable is pulled including means frictionally engaging the pulling portion of the cable for generating a braking input force when the cable is pulled and means for transmitting the braking input force to the pulled portion of the cable.

* * * * *